June 17, 1952 M. M. PALO ET AL 2,600,914

TONE ARM

Filed June 26, 1946 2 SHEETS—SHEET 1

Inventors.
MAURICE M. PALO
F. WILLIAM SCHMID

By Francis J. Klempay

Attorney

June 17, 1952 M. M. PALO ET AL 2,600,914

TONE ARM

Filed June 26, 1946 2 SHEETS--SHEET 2

Inventors.
MAURICE M. PALO
F. WILLIAM SCHMID

By Francis J. Klempay
Attorney

Patented June 17, 1952 2,600,914

UNITED STATES PATENT OFFICE 2,600,914

TONE ARM

Maurice M. Palo and Ford William Schmid, Conneaut, Ohio, assignors to The Astatic Corporation, Conneaut, Ohio Application June 26, 1946, Serial No. 679,378

5 Claims. (Cl. 274—23)

This invention relates to tone arms as employed in the reproduction of recorded music or other transcriptions from records of tablet form and has to do more particularly with improved means for mounting and for providing for the adjustment of such arms.

The principal object of the present invention is to provide novel means for mounting a tone arm upon the motor board or other support of a record player which means shall assure efficient insulating and dampening of undesirable vibrations and the prevention of their transmission to the pickup head of such arm.

A further object of the invention is the provision of an adjusting device in a tone arm of the type described which shall render adjustable the pressure upon the stylus to conform to the operating pressure requirements of the particular transducer employed in the arm.

Yet another object of the invention is the provision of novel anchoring means to render the tone arm immovable when desired.

A further object of the invention is the provision of a stop mechanism to prevent the accidental dropping of the tone arm upon the surface of the motor board with sufficient force to damage the stylus on the transducer unit.

A second stop is also provided to limit the travel of the arm when it is being raised for the purpose of changing or inspecting the stylus thereof.

In maintaining a record player assembly at peak operating efficiency it is frequently necessary to inspect the transcribing stylus or to replace it. This is facilitated, according to the principles of the present invention, by providing a pivoted mounting for the tone arm which permits raising the stylus-bearing end thereof into a vertical position in which position the stylus may more readily be inspected and/or removed for replacement. Means is also afforded to insure that the tone arm will not be easily caused to fall to its normal horizontal position and thus result in damage to the stylus or transducer unit.

Yet another object of the invention is the provision of an improved general tone arm construction to render more expeditious the assembly of the arm.

These and other objects and advantages of the invention will become apparent upon consideration of the following detailed specification and the accompanying drawing wherein there is disclosed a preferred embodiment of the invention together with a disclosure of modified forms of several of the more important coacting parts of the invention.

Figure 1:
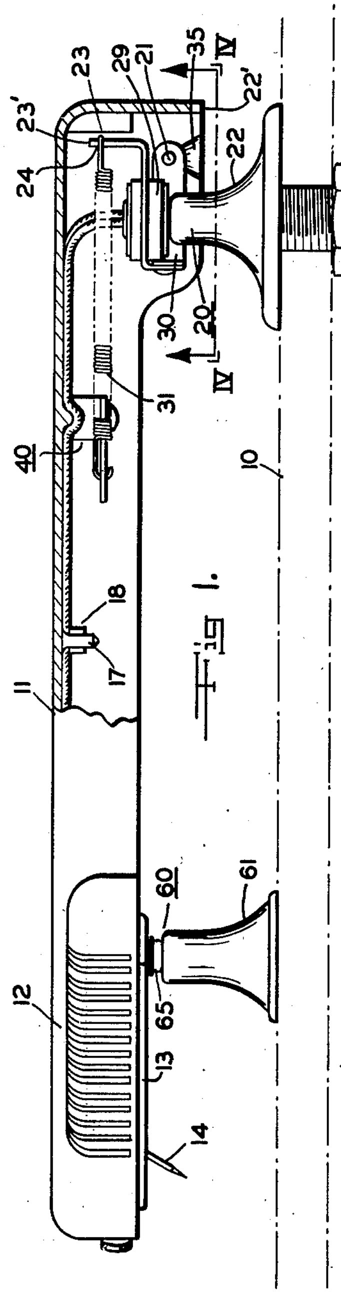
Figure 1 is a side elevation of a pickup arm constructed in accordance with the principles of the present invention, with certain of the parts broken away to clarify the illustration.

Referring now to the drawing more in detail, reference numeral 10 indicates the base or motor board which supports the normally associated motor and turntable not shown and the tone arm 11 of a record-playing assembly all according to usual practice in the art. The tone arm 11 is illustrated as being a die-cast metal member although any suitable material, as molded plastic or resin for example, might be used and its design might be altered to a considerable extent without departing from the spirit of the invention.

The principal features of the invention reside in the rear support assembly 20, the spring adjusting device 40 and the front anchorage means 60 each of which will later be described in detail.

The forward end portion 12 of arm 11 houses the piezo-electric transducer unit 13 which receives the record engaging stylus 14 in clamped relation within chuck 15. Electrical contact is established with the associated amplifier through wires 16 which are held within the body of arm 11 by being placed between two pins 17 and there secured by the resilient wedge 18.

Figures 2, 3:
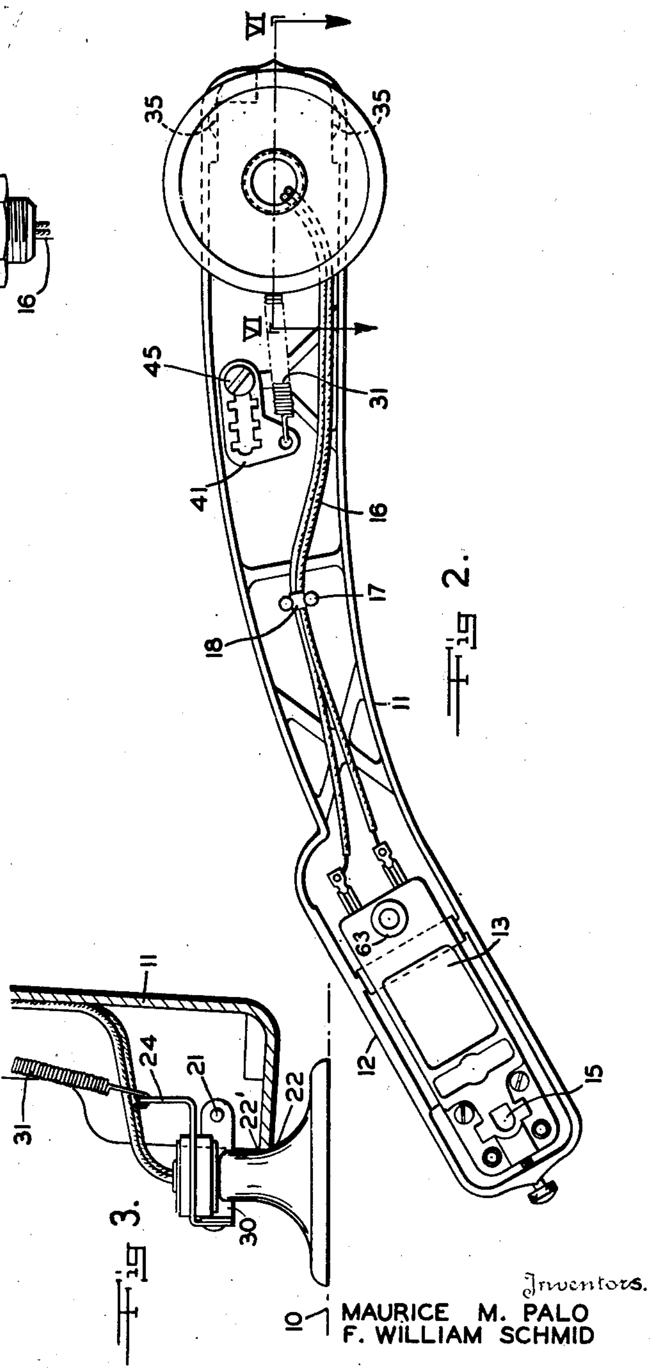
Figure 2 is a plan view of the under side of the arm of Figure 1.
Figure 3 is a fragmentary view of the rearward portion of the arm of Figure 1 showing certain of the parts in a raised position.

The rear support assembly 20 affords support to the rear end of tone arm 11 while yet permitting limited universal movement of said arm. Motion in a direction parallel to the surface of the associated record disc is permitted about the axis of the support 20 while motion in an arcuate manner at right angles to the plane of said parallel motion is permitted about the horizontal axis established by the two pivot pins 21. Thus it will be understood that the needle 14 and the forward end of arm 11 may move inwardly upon the surface of the record disk and may also be raised upwardly from the surface of the record at the will of the operator. This latter upward motion is limited by the eventual meeting of surfaces 22 and 22′ as shown in Figure 3. A raised boss 23 is provided on the inner surface of the rear wall of arm 11 to bear against surface 23′ of spring hook 24 and thus to prevent the forward end of arm 11 from accidentally dropping upon the surface of the motor board.

Figure 8:
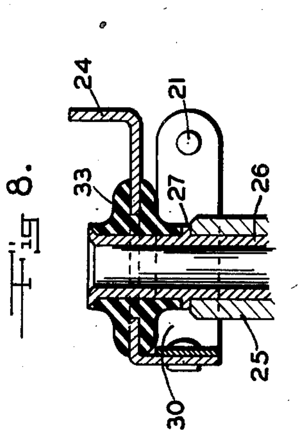
Figures 7 and 8 are two modifications of the rear support assembly of Figure 6.
Figure 7:
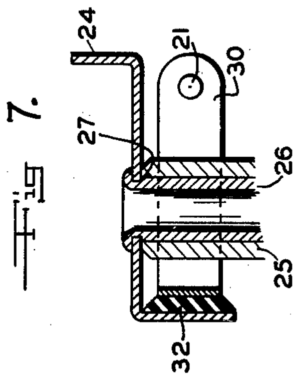
Figure 6:
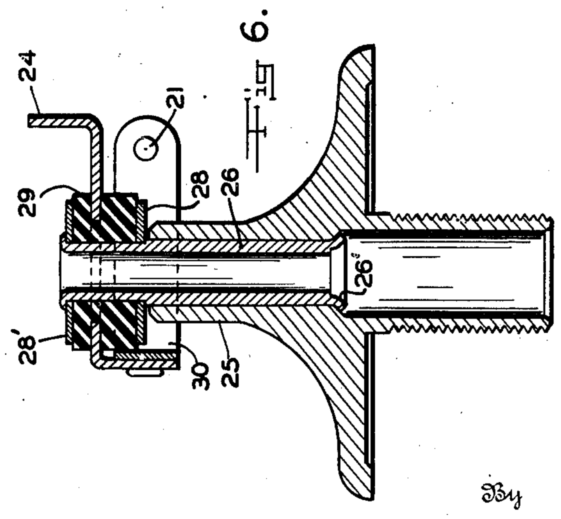
Figure 6 is a sectional view taken at the vertical centerline of the rear support and is oriented by the line VI—VI of Figure 2.

The pivotal action of rear support assembly 20 and its vibration dampening components are best illustrated in Figure 6 and two preferred modifications are shown in Figures 7 and 8. The main support tube 25 is held securely to the motor board 10 and journals for free rotation within itself, pivot tube 26. Tube 26 is restrained from axial movement by the flared lower portion 26′ and variously by the upper shoulder 27 as seen in Figures 7 and 8 or by the washer shown at 28 in Figure 6.

A rubber vibration insulator 29 is supported about the upper portion of pivot tube 26 by washer 28 and is held in place by a mating washer 28′ as seen in Figure 6. The extreme upper end of tube 26 may be peened outwardly to secure washer 28′. A spring hook plate 24 is partially embedded in insulator 29 and has attached at its forward and downwardly extending end the pivot pin spring 30. Spring 30 is formed in U-shape having its open arms extending rearwardly of the tone arm assembly to bear the pivot pins 21, one on each of its respective two arms. The rearwardly and upwardly extending end of spring hook plate 24 is adapted to secure one end of the tension spring 31. The assembly of pivot tube, vibration insulator and washers as described thus far in this paragraph lends itself admirably to applications where it is desirable to assemble various components in a production line. The completed assembly, as illustrated in Figure 6, possesses one critical characteristic in that it may be rendered slightly defective in operation by the application of excessive restrictive forces applied between washer 28 and washer 28′ at the time of assembly. Also, since rubber vibration insulator 29 is held in compression, the resultant vibration period thereof will be understood to be dependent, not so much upon the physical character of the rubber itself as upon the degree of compressive force exerted upon it by washers 28 and 28′.

We have provided two modified forms of rubber vibration dampeners which possess extremely desirable operational characteristics. These two forms are illustrated in Figures 7 and 8, respectively, and attention is directed first to the former figure wherein the spring hook plate 24 is attached directly to pivot tube 26 by swaging as is well understood. A rubber vibration pad 32 is interposed between suitable flat surfaces of plate 24 and pivot pin spring 30, as shown, and is secured to both of the respective surfaces by vulcanized adhesion as is well known in the art. The various ancillary components, as tube 26, plate 24 and spring 30 are made to serve their usual purposes as described above.

The second modification, as illustrated in Figure 8, shows a vibration collar 33 interposed between tube 26 and plate 24, completely encircling the former, partially embedding the latter, and securely attached to suitable surfaces of both by vulcanized adhesion as set forth above. Spring hook plate 24 may now be rigidly secured to pivot pin spring 30 and parts 24, 26, 30 serve their usual purposes. Thus, in both embodiments of Figures 7 and 8, we accomplish the securing of the supporting elements 25 and 26 to the pivot elements 24 and 30 in a manner which places the interposed rubber insulator in a physical condition of shear stress as preferred over the formerly described condition of compressive stress and in this manner we may provide a tone arm having less undesirable vibrational characteristics.

As a further aid in expediting the assembly of our tone arm we have provided the opposite inner surfaces of the rearward portion of tone arm 11 with tapering conductor grooves 35 to permit easy insertion of pivot pins 21 into their respective recesses 21′.

Figure 5:
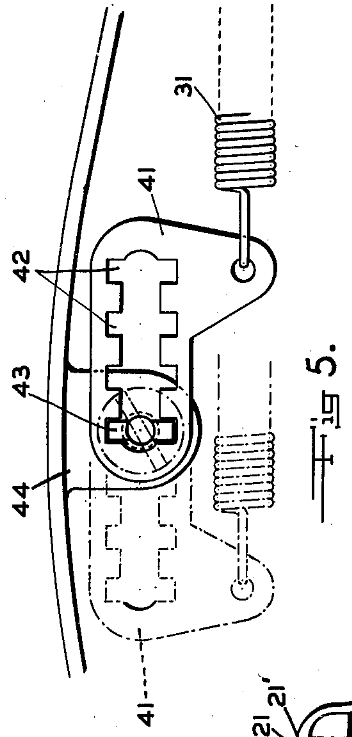
Figure 5 is a fragmentary view of the adjusting mechanism of the assembly of Figure 2.
Figure 9:
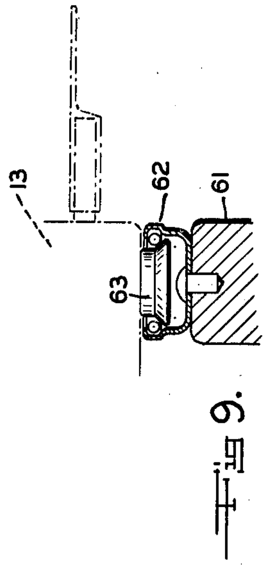
Figure 9 is an enlarged view, partly in section of the anchorage means for the front end of the arm of Figure 1.
Figure 4:
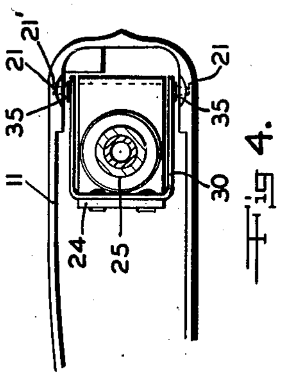
Figure 4 is a plan view of the under side of the arm of the invention and is taken along the line IV—IV of Figure 1.

To permit accurate variation of the tone arm operating pressure we make this pressure inversely dependent upon the lifting force exerted upon arm 11 by spring 31. The tension upon spring 31 may be varied by selectively positioning spring tension plate 41 so that any one of its several notches 42 registers upon key 43 of key boss 44. As plate 41 may be installed in either of two positions, as illustrated in Figure 5 it will be seen that considerable latitude of control is possible. Screw 45 assures security of adjustment. It should be noted that the relative locations of pivot pins 21, spring hook 24 and spring tension plate 41 are such that as arm 11 is raised to the position shown in Figure 3 spring 31 will act to maintain the arm in position with surfaces 22 and 22′ in contact.

For securing arm 11 in its downward position and for rendering it immovable, as suggested above, the anchorage post 61 is provided, located upon motor board 10. The female half 62 of a friction snap-fastener 65 is affixed to the upper surface of post 61 and the mating male half 63 is secured to the under side of transducer unit 13. The two parts of the fastener 65 may thus be engaged to rigidly secure arm 11 to post 61 during transporting for example.

It should thus be apparent that we have provided a tone arm which accomplishes the object initially set forth. The above embodiments should be considered as being illustrative only as obviously many changes may be made therein without departing from the spirit of the invention. Reference should therefore be had to the appended claims in determining the scope of the invention.

What we claim is:

1. In a tone arm the combination of a vertical pintle, means mounting said pintle for free rotation about its vertical axis, an elongated support carrying a stylus adjacent its forward end and having spaced downward extending flanges adjacent its opposite end, a mounting plate carried by said pintle and having a downwardly turned forward end and an upward turned opposite end, a U-shaped strap secured to said downwardly turned end of said mounting plate and having rearwardly disposed arms flexible laterally, pintle pins projecting laterally outward from the rear end portions of said arms, recesses in the inner surfaces of said flanges to receive said pins, and horizontally disposed resilient tensioning means interconnecting said upward turned end of said plate and an intermediate portion of said elongated support.

2. A structure according to claim 1 further including means for manually adjusting the initial tension of said resilient tensioning means, and guide surfaces upon the said inner surfaces contiguous to said recesses for facilitating entry of said pins into said recesses.

3. Apparatus for pivotally mounting an elongated tone arm comprising in combination a vertically disposed member mounted for rotation about a vertical axis, a resilient rubber member securely bonded to said member, a plate partially imbedded in and carried by said rubber member, means pivotally mounting said arm on said plate for pivotal movement about a horizontal axis, said plate being formed with an upwardly turned rear end portion and a downwardly turned front end portion, said last named means comprising a rearwardly disposed yoke having its center portion secured to said downwardly turned portion and bearing pintle pins on its arms for co-action with bearing recesses in said elongated arm, and resilient tensioning means interconnected between said arm and said upwardly turned portion tending to bias said arm in upwardly tilted position.

4. Apparatus of the character described comprising in combination an elongated channel-shaped arm and means adjacent one end of said arm to pivotally support said arm for rotation about vertical and horizontal axes, adjustable resilient tensioning means housed within the channel of said arm and interconnected between said arm and said arm supporting means normally tending to bias said arm to upwardly tilted position; and means to shift the location of the point of interconnection of said tensioning means with said arm whereby the resilient force exerted by said tensioning means may be varied; said shifting means comprising an anchoring plate for one end of said tensioning means, a transverse lug on said arm, said plate having a series of longitudinally spaced transverse slots adapted to be alternatively applied over said lug, and releasable means to secure said plate with respect to said lug.

5. In a tone arm mounted at one end for pivotal movement about a horizontal axis, means to vary and indicate the unsupported weight of the opposite end of said arm comprising a resilient tensioning member connected to said arm and tending to bias said arm in upward tilting position, and means to vary in predetermined increments the point of interconnection of said tensioning means with said arm; said last mentioned means comprising a longitudinally extending anchor plate having a laterally projecting anchor portion for said tensioning member, a transverse lug on said arm, and transversely disposed but longitudinally spaced recesses in said plate adapted to have alternate engagement with said lug, the arrangement being such that said plate is reversible to position said anchor portion either forwardly or rearwardly of said lug whereby a wide range of adjustments may be effected.

MAURICE M. PALO.
F. WILLIAM SCHMID.

REFERENCES CITED

The following references are of record in the file of this patent:

UNITED STATES PATENTS

| Number | Name | Date |
|---|---|---|
| 1,974,070 | Hibbard | Sept. 18, 1934 |
| 2,069,136 | Durand et al. | Jan. 26, 1937 |
| 2,174,156 | Guedon | Sept. 26, 1939 |
| 2,254,732 | Dally | Sept. 2, 1941 |
| 2,294,576 | Schneider | Sept. 1, 1942 |
| 2,331,122 | Jones | Oct. 5, 1943 |
| 2,342,457 | Dally | Feb. 22, 1944 |
| 2,363,655 | Dally | Nov. 28, 1944 |
| 2,434,033 | Cain | Jan. 6, 1948 |